US011135938B2

(12) United States Patent
Arima et al.

(10) Patent No.: US 11,135,938 B2
(45) Date of Patent: Oct. 5, 2021

(54) ENERGY MANAGEMENT

(71) Applicant: Honda Motor Co., Ltd., Tokyo (JP)

(72) Inventors: Takero Arima, Torrance, CA (US); James Marion Cournyer, Newport Beach, CA (US); Robert Uyeki, Torrance, CA (US); Geoffrey Woo Honda, Torrance, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 253 days.

(21) Appl. No.: 16/526,930

(22) Filed: Jul. 30, 2019

(65) Prior Publication Data

US 2021/0031647 A1 Feb. 4, 2021

(51) Int. Cl.
*B60L 53/66* (2019.01)
*B60L 58/22* (2019.01)
(Continued)

(52) U.S. Cl.
CPC .............. *B60L 53/665* (2019.02); *B60L 53/66* (2019.02); *B60L 53/80* (2019.02); *B60L 58/22* (2019.02); *B60S 5/06* (2013.01); *G06F 3/14* (2013.01); *G06Q 20/06* (2013.01); *G06Q 30/018* (2013.01); *G06Q 30/0215* (2013.01); *G06Q 50/06* (2013.01); *H04L 67/18* (2013.01); *B60L 53/68* (2019.02); *B60L 58/00* (2019.02); *B60L 58/10* (2019.02); *B60L 2240/72* (2013.01);
(Continued)

(58) Field of Classification Search
CPC ........ B60L 53/665; B60L 58/22; B60L 53/66; B60L 53/80; B60L 2240/72; B60L 58/10; B60L 53/68; B60L 58/00; G06F 3/14; Y02T 10/7072; Y02T 10/70; Y02T 90/16; Y02T 90/12; G01R 31/382; G01S 19/51; H04L 29/08; H04L 67/18; G06Q 30/02; G06Q 30/00; G06Q 30/0215; G06Q 50/06; G06Q 20/06; G06Q 30/018; G01C 21/34; G01C 21/3438
See application file for complete search history.

(56) References Cited

U.S. PATENT DOCUMENTS 8,963,481 B2 2/2015 Prosser et al.
9,079,505 B1 7/2015 Hyde et al.
(Continued)

FOREIGN PATENT DOCUMENTS

JP 2012120416 A 6/2012

*Primary Examiner* — Vuthe Siek
(74) *Attorney, Agent, or Firm* — Rankin Hill & Clark LLP

(57) ABSTRACT

According to one aspect, energy management or battery pack distribution may be achieved by receiving a location associated with a portable battery dispensing vehicle which carries or stocks modular battery replacement packs for electric vehicles, determining a location of a mobile device associated with the system for energy management, displaying the location associated with the portable battery dispensing vehicle and the location associated with the mobile device, receiving a request associated with a purchase of one of the modular battery replacement packs carried by the portable battery dispensing vehicle, and generating an instruction to credit an associated account with a virtual energy credit based on the request associated with the purchase of one or more of the modular battery replacement packs.

20 Claims, 7 Drawing Sheets

(51) Int. Cl.
*B60L 53/80* (2019.01)
*B60L 58/10* (2019.01)
*B60L 53/68* (2019.01)
*B60L 58/00* (2019.01)
*H04L 29/08* (2006.01)
*G06Q 30/02* (2012.01)
*G06Q 50/06* (2012.01)
*G06Q 20/06* (2012.01)
*G06Q 30/00* (2012.01)
*G06F 3/14* (2006.01)
*B60S 5/06* (2019.01)
*G01S 19/51* (2010.01)
*G01R 31/382* (2019.01)
*G01C 21/34* (2006.01)

(52) U.S. Cl.
CPC ........ *G01C 21/3438* (2013.01); *G01R 31/382* (2019.01); *G01S 19/51* (2013.01); *Y02T 10/70* (2013.01); *Y02T 10/7072* (2013.01)

(56) References Cited

U.S. PATENT DOCUMENTS

| | | | |
|---|---|---|---|
| 9,550,429 B2 | 1/2017 | Madurai-Kumar et al. | |
| 9,669,293 B1* | 6/2017 | Kornmann | A63F 13/00 |
| 2012/0019195 A1 | 1/2012 | Gagnon | |
| 2015/0151723 A1* | 6/2015 | Yang | B60L 53/80 |
| | | | 414/331.09 |
| 2015/0311487 A1* | 10/2015 | Choi | H01M 50/20 |
| | | | 429/98 |
| 2016/0043764 A1* | 2/2016 | Huang | H04M 1/185 |
| | | | 455/575.8 |

* cited by examiner

ENERGY MANAGEMENT

BACKGROUND

Electric vehicles (EVs) are vehicles that run on batteries. Recharging of EVs may take quite some time, depending on the charging station. In fact, some models may require anywhere between four hours to twenty hours to reach a full charge. The availability of charging stations may also be inconsistent. During different seasons, supply and demand of electricity may fluctuate, thereby changing rates for charging of EVs, further complicating matters.

BRIEF DESCRIPTION

According to one aspect, a system for energy management may include a communication interface, a global positioning system, a memory, a display, and a processor. The communication interface may receive a location associated with a portable battery dispensing vehicle. The portable battery dispensing vehicle may carry one or more modular battery replacement packs associated with an electric vehicle. The global positioning system may determine a location associated with a mobile device associated with the system for energy management. The memory may store the location associated with the portable battery dispensing vehicle and the location associated with the mobile device. The display may display the location associated with the portable battery dispensing vehicle and the location associated with the mobile device. The processor may receive a request associated with a purchase of one of the modular battery replacement packs carried by the portable battery dispensing vehicle. The processor may generate an instruction to credit an associated account with a virtual energy credit based on the request associated with the purchase of one or more of the modular battery replacement packs.

The global positioning system may generate turn-by-turn navigation instructions from the location associated with the mobile device to the location associated with the portable battery dispensing vehicle. The portable battery dispensing vehicle may be a dealer-affiliated vehicle or a private party owned vehicle. One or more of the modular battery replacement packs may be charged at off-peak or excess renewable energy times. The communication interface may receive a charge level associated with the electric vehicle and the display may display the charge level of the electric vehicle.

According to one aspect, a system for energy management may include a communication interface, a memory, and a processor. The communication interface may receive a location associated with a portable battery dispensing vehicle. The portable battery dispensing vehicle may carry one or more modular battery replacement packs associated with an electric vehicle. The communication interface may receive a location associated with a mobile device associated with the system for energy management. The memory may store the location associated with the portable battery dispensing vehicle and the location associated with the mobile device. The processor may receive a request associated with a purchase of one of the modular battery replacement packs carried by the portable battery dispensing vehicle. The processor may generate an instruction to credit an associated account with a virtual energy credit based on the request associated with the purchase of one or more of the modular battery replacement packs.

The processor may generate turn-by-turn navigation instructions from the location associated with the mobile device to the location associated with the portable battery dispensing vehicle and the communication interface may transmit the turn-by-turn navigation instructions to the mobile device. The portable battery dispensing vehicle may be a dealer-affiliated vehicle or private party owned vehicle. One or more of the modular battery replacement packs may be charged at off-peak or excess renewable energy times. The processor may identify a location associated with lower electricity pricing or excess renewable energy. The communication interface may transmit an instruction to the portable battery dispensing vehicle to travel to the location associated with the peak demand response time charge.

According to one aspect, a system for energy management may include a global positioning system, a communication interface, a processor, and a controller. The global positioning system may determine a location associated with a portable battery dispensing vehicle. The communication interface may transmit the location associated with the portable battery dispensing vehicle. The portable battery dispensing vehicle may carry one or more modular battery replacement packs associated with an electric vehicle. The processor may receive a request associated with a purchase of one of the modular battery replacement packs carried by the portable battery dispensing vehicle and an indication of a debit to an associated account for a virtual energy credit based on the request associated with the purchase of one or more of the modular battery replacement packs. The controller may unlock a mechanism to enable access to one or more of the modular battery replacement packs based on the indication of the debit to the associated account for the virtual energy credit.

The portable battery dispensing vehicle may be a dealer-affiliated vehicle or private party owned vehicle. One or more of the modular battery replacement packs may be charged at off-peak or excess renewable energy times. The processor may identify a location associated with lower electricity pricing or excess renewable energy. The controller may provide an instruction to the portable battery dispensing vehicle to travel to the location associated with the peak demand response time charge. The system for energy management may include a sensor. The sensor may detect a presence of a mobile device associated with the request for purchase. The controller may unlock the mechanism to enable access to one or more of the modular battery replacement packs based on the indication of the debit to the associated account for the virtual energy credit and the detected presence of the mobile device. The processor may adjust the debit to the associated account based on whether a used modular battery replacement pack is returned to the portable battery dispensing vehicle in place of the purchased modular battery replacement pack.

DETAILED DESCRIPTION

Figure 1:
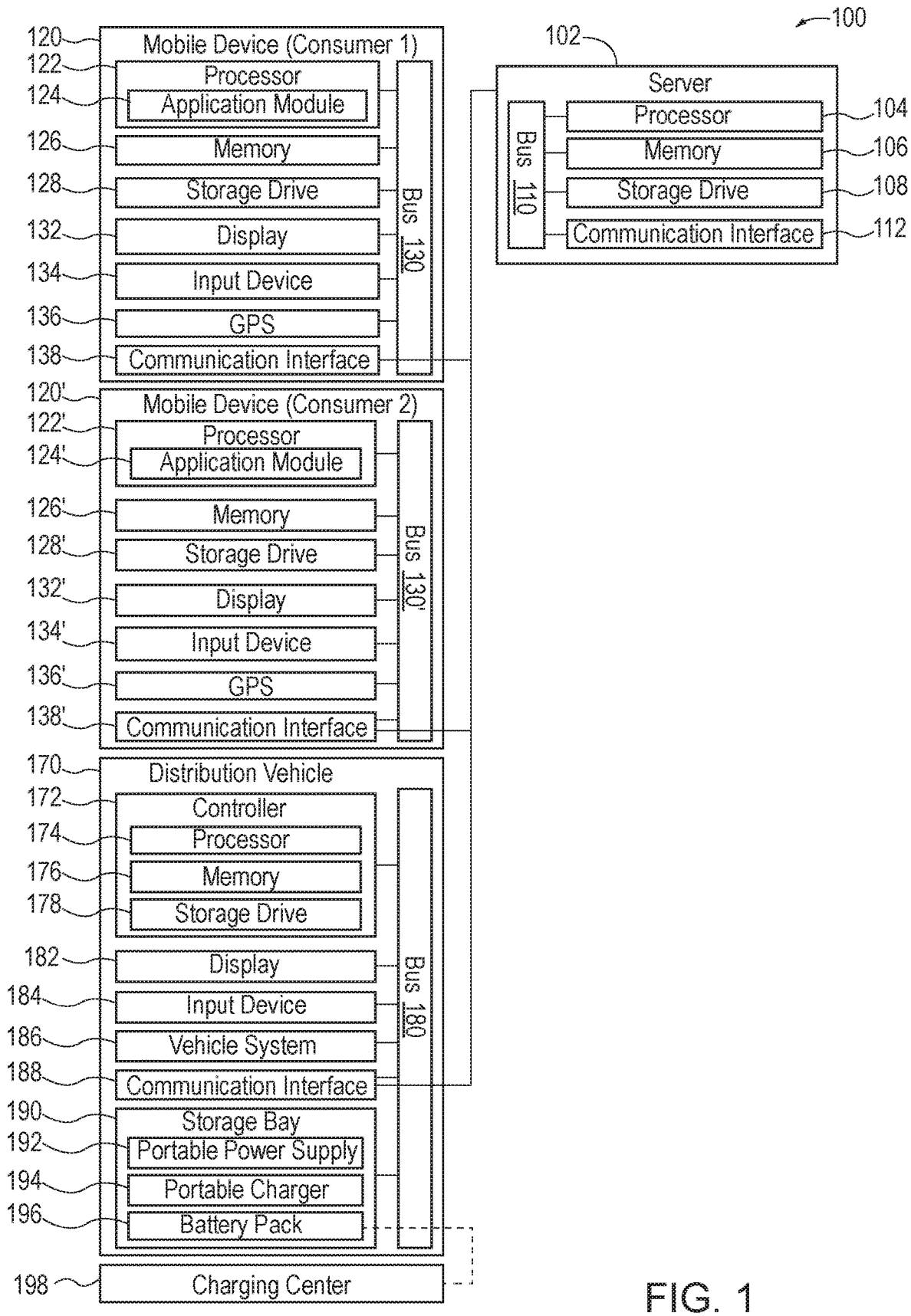
FIG. 1 is an illustration of an exemplary component diagram of a system for energy management, according to one aspect.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing. Mobile devices include handheld devices, mobile devices, smart phones, laptops, tablets, and e-readers.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, driving, and/or safety. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

FIG. 1 is an illustration of an exemplary component diagram of a system 100 for energy management, according to one aspect. The system 100 for energy management may be implemented on a server 102, a mobile device 120, or a distribution vehicle 170, which may be an autonomous vehicle. The server 102 may include a processor 104, a memory 106, a storage drive 108, a bus 110, and a communication interface 112. The mobile device 120 may include a processor 122 executing an application module 124, a memory 126, a storage drive 128, a bus 130, a display 132, an input device 134, a global positioning system (GPS) 136, and a communication interface 138. Additional mobile device 120s may include similar components (e.g., a processor 122' executing an application module 124', a memory 126', a storage drive 128', a bus 130', a display 132', an input device 134', a GPS 136', and a communication interface 138'). The distribution vehicle 170 or portable battery dispensing vehicle may include a controller 172 including a processor 174, a memory 176, and a storage drive 178. The distribution vehicle 170 or portable battery dispensing vehicle may include a bus 180, a display 182, an input device 184, one or more vehicle systems 186, which may include a global positioning system (GPS) or one or more vehicle sensors, a communication interface 188, and a storage bay 190 including a portable power supply 192, a portable charger 194, and modular battery replacement packs 196.

One or more of the modular battery replacement packs 196 may be charged at off-peak or excess renewable energy times at a charging center 198 and/or charged using the portable charger of the distribution vehicle 170. For example, based on demand response, one or more of the modular battery replacement packs 196 loaded in the storage bay 190 of the distribution vehicle 170 may be charged during times of day when power from the utility company (e.g., charging center 198) is cheaper or charged up to a threshold amount based on a first condition and charged up to a full charge based on a second condition. The first condition or the second condition may include charging regardless of demand response and/or charging during optimal power grid conditions to maximize profit. Further, modular battery replacement packs 196 may be charged up to a profit threshold amount associated with anticipated future demand to maximize operating profit based on historical grid data or historical user demand.

According to one aspect, one or more of the modular battery replacement packs 196 loaded in the storage bay 190 of the distribution vehicle 170 may be utilized to provide power to the power grid during peak pricing times. In this way, the modular battery replacement packs 196 may be charged in a cost efficient fashion at the charging center 198.

As used herein, off-peak refers to off-peak charge rates or off-peak demand times when electrons are cheaper. Regardless of grid conditions, there may be peak times (e.g., the most expensive), off-peak times (e.g., cheaper), and/or super off-peak times (e.g., cheapest) where the cost of electricity varies. Demand response is when a utility sends a signal to reduce load or request load reduction. Demand response of V1G is when the utility requests to stop charge when there is a high demand for electricity versus supply. In this regard, a demand response signal may be sent to stop EV charging for an incentive if the utility has a V1G program. If a utility has an excess renewable program, they can send a signal to start charging during excess solar load. If a utility does not have any such program, the OEM can instruct the user to charge during off-peak/super off peak times to reduce costs. If the EV provides power to the grid, the utility may pay for the power from the EV. In other words, the OEMs may send a signal to EVs to stop charging, but often, compensation may be provided in exchange for the EVs to stop charging.

Thus, system 100 for energy management may facilitate minimization of charging during demand response events to collect incentives, maximization of charging during excess renewable events to collect the incentives, minimization of charging during peak charging times to minimize electricity costs, maximization of charging during super off-peak times to minimize costs, and identify locations or anticipate locations and/or times to optimize grid conditions.

Mobile Device Implementation

Purchasing Charged Modular Battery Replacement Packs

According to one aspect, the system 100 for energy management or modular battery replacement may be implemented as an application, a portal, a website, or as an interface which enables consumers to locate a portable battery dispensing vehicle (e.g., the distribution vehicle 170), place an order for a modular battery replacement pack, purchase credits in association with the modular battery replacement packs, or sell charged modular battery replacement packs. For example, the communication interface 138 of the mobile device 120 may receive a location associated with a portable battery dispensing vehicle or the distribution vehicle 170. As previously discussed, the portable battery dispensing vehicle may carry one or more modular battery replacement packs 196 associated with an electric vehicle for vending. In other words, the portable battery dispensing vehicle may be a mobile marketplace for modular battery replacement packs 196. These modular battery replacement packs 196 may be interchangeably swapped out for different electric vehicles, such as an electric vehicle (EV) being driven by a user.

In this regard, the user driving the EV may download an application or app on his or her mobile device 120, and interface with the application to locate the portable battery dispensing vehicle or the distribution vehicle 170, place an order for the modular battery replacement pack, purchase credits in association with the modular battery replacement packs, or sell charged modular battery replacement packs. The application module 124 of the processor 122 may handle execution of the application associated with energy management or modular battery replacement. With regard to the locating of the portable battery dispensing vehicle or the distribution vehicle 170, the global positioning system 136 of the mobile device 120 may determine a location associated with the mobile device 120. This mobile device 120 may be associated with the system 100 for energy management or be the device on which the system 100 for energy management is implemented.

The memory 126 of the mobile device may store the location associated with the portable battery dispensing vehicle and the location associated with the mobile device 120. The display 132 may display or render the location associated with the portable battery dispensing vehicle and the location associated with the mobile device 120, thereby enabling identification of the location associated with the portable battery dispensing vehicle relative to the location associated with the mobile device 120, as will be described with respect to FIG. 4C. Further, the global positioning system 136 of the system 100 for energy management (e.g., the mobile device 120, in this example) may generate turn-by-turn navigation instructions from the location associated with the mobile device 120 to the location associated with the portable battery dispensing vehicle (e.g., the distribution vehicle 170), enabling a user to travel from his or her current location (e.g., the location of the mobile device 120) to the location of the portable battery dispensing vehicle or distribution vehicle 170.

According to one aspect, the distribution vehicle 170 or the portable battery dispensing vehicle may be a dealer-affiliated vehicle. According to another aspect, the distribution vehicle 170 or the portable battery dispensing vehicle may be a private party owned vehicle. As previously indicated, one or more of the modular battery replacement packs 196 stored within the storage bay 190 of the distribution vehicle 170 may be charged at off-peak or excess renewable energy times and/or charged using the portable charger 194 and the portable power supply 192 of the distribution vehicle 170.

The processor 122 of the mobile device 120 may receive a request associated with a purchase of one of the modular battery replacement packs 196 carried by the portable battery dispensing vehicle from the input device 134 (e.g., keyboard, virtual keyboard, microphone, etc.) of the mobile device 120. This request may be input by a user via the input device 134 of the mobile device 120 and through the energy management application, which may be executed via the application module 124 of the processor 122. The processor 122 may generate an instruction to credit an associated account with a virtual energy credit based on the request associated with the purchase of one or more of the modular battery replacement packs.

The virtual energy credit may be associated with a lease or a subscription service. For example, when the request associated with the purchase of one of the modular battery replacement packs is placed, the processor 122 of the mobile device 120 may initiate the purchase by setting up the lease or subscription as a recurring or monthly fee, or as an annual subscription. Further, different tiers of subscriptions may be provided. For example, a first tier may enable a user to swap up to a first number of modular battery replacement packs per month, while a second tier may enable a user to swap up to a second number of modular battery replacement packs per month. According to another aspect, a first tier may enable a user to swap a first battery type (e.g., a first amount of mAH), while a second tier may enable a user to swap a second battery type (e.g., a second amount of mAH).

Additionally, processor 122 may generate an instruction to debit an associated payment method account for a cost of the virtual energy credit based on the request. The debit to the associated payment method may be for the monthly subscription or annual fee, for example. In this way, the system 100 for energy management may be implemented on the mobile device 120 to facilitate transactions for the purchase of one or more of the modular battery replacement packs 196 using a virtual currency. According to another aspect, the purchase of one or more of the modular battery replacement packs 196 may be implemented utilizing real currency.

According to one aspect, the communication interface 138 may receive a charge level associated with an associated electric vehicle and the display may render or display the charge level of the electric vehicle, thereby enabling the user to know when to replace the modularly replaceable battery replacement pack for his or her EV.

Selling Charged Modular Battery Replacement Packs

According to one aspect, a private party, such as a party utilizing the second mobile device 120', may utilize the energy management application to sell charged modular battery replacement packs. For example, the processor 122' of the second mobile device 120' may receive a request, an instruction, or a user input from the input device 134' of the second mobile device 120' indicative of a desire to sell one or more charged modular battery replacement packs. In this regard, the global positioning system 136' of the second mobile device 120' may determine a location associated with the second mobile device 120'. The communication interface 138' of the second mobile device 120' may transmit the location associated with the second mobile device 120' to the server 102. The processor 122' of the second mobile device 120' may receive a request associated with a purchase of the modular battery replacement pack 196 and an indication of payment to the owner of the second mobile device 120' based on the request associated with the purchase of the modular battery replacement pack 196 (e.g., from the server 102). Upon receipt of the payment, the location of the second mobile device 120' may be transmitted to the first mobile device 120, for example, via the server 102. In this way, features of the distribution vehicle 170 or system 100 for energy management may be implemented via two or more mobile device 120s. Stated another way, the second mobile device 120' may perform functionality similar or identical to the distribution vehicle 170, as will be described in greater detail below.

Server 102 Implementation

According to one aspect, the system 100 for energy management or modular battery replacement may be implemented via the server 102 which facilitates or coordinates locating the portable battery dispensing vehicle (e.g., the distribution vehicle 170), placing and receiving orders for the modular battery replacement pack, purchasing credits in association with the modular battery replacement packs, or selling charged modular battery replacement packs.

According to this aspect, the communication interface 112 of the server 102 may receive the location associated with the portable battery dispensing vehicle or the distribution vehicle 170, which may carry or stock one or more of the modular battery replacement packs 196 associated with the electric vehicle (i.e., modular battery replacement packs 196 utilized to power the EV). The portable battery dispensing vehicle or the distribution vehicle 170 may carry or stock a variety of different types (e.g., different sizes, different voltage, amperage, power levels, etc.) of the modular battery replacement packs. The communication interface 112 may also receive the location associated with the mobile device 120 associated with the system 100 for energy management.

Similarly to the mobile device 120 implementation, the memory 106 may store the location associated with the portable battery dispensing vehicle and the location associated with the mobile device 120. The processor 104 of the server 102 may receive a request associated with a purchase of one of the modular battery replacement packs 196 carried by the portable battery dispensing vehicle from a user interfacing with the energy management application on the mobile device 120. The processor 104 may generate an instruction to credit the associated account with the virtual energy credit based on the request associated with the purchase of one or more of the modular battery replacement packs 196 and/or generate an instruction to debit an associated payment method account for a cost of the virtual energy credit based on the request. The server 102 may also provide or transmit an unlock code to the mobile device 120 via the communication interface 112 based on the instruction to debit the associated payment method account.

According to one aspect, the processor 104 of the server 102 may generate the turn-by-turn navigation instructions from the location associated with the mobile device 120 to the location associated with the portable battery dispensing vehicle and the communication interface 112 may transmit these turn-by-turn navigation instructions to the mobile device 120.

According to one aspect, the server 102 may have access to or include information related to real-time demand response information, such as live pricing, current electricity usage, current load on the electricity grid, etc. In this regard, the processor 104 of the server 102 may identify a location associated with lower electricity pricing or excess renewable energy. For example the location associated with the lower electricity pricing or excess renewable energy may be charging peak demand response prices to consumers in the area or price per kilowatt-hour. The processor 104 of the server 102 may generate an instruction to the portable battery dispensing vehicle to travel to the location associated with the peak demand response time charge and the communication interface 112 may transmit this instruction to the portable battery dispensing vehicle. The portable battery dispensing vehicle may display this instruction to a human driving the vehicle or autonomously navigate from a current location of the portable battery dispensing vehicle to the location associated with lower electricity pricing or excess renewable energy. This navigation may be performed by the global positioning system or vehicle systems 186 of the portable battery dispensing vehicle.

Distribution Vehicle 170 Implementation

According to one aspect, the system 100 for energy management or modular battery replacement may be implemented at the portable battery dispensing vehicle (e.g., the distribution vehicle 170) to enable distribution and sale of charged modular battery replacement pack. According to this aspect, the portable battery dispensing vehicle may include the global positioning system, the communication interface 188, the processor 174 and memory 176, and the controller 172. The portable battery dispensing vehicle may carry or stock one or more modular battery replacement packs 196 associated with use within an electric vehicle. In other words, the modular battery replacement packs 196 may be interchangeably swapped out to power the EV. According to one aspect, the system 100 for energy management or modular battery replacement may be implemented using a dealer-affiliated, portable battery dispensing vehicle as the distribution vehicle 170. According to another aspect, private parties may utilize the energy management application to sell or distribute the modular battery replacement packs. In this aspect, the portable battery dispensing vehicle may be a private party owned vehicle and the features of the distribution vehicle 170 described herein may be applied to the second mobile device 120' (e.g., the second mobile device 120' may perform functions of the distribution vehicle 170).

As previously discussed, one or more of the modular battery replacement packs 196 are charged at off-peak or excess renewable energy times. Further, the energy management application may set limits on pricing so that modular battery replacement pack 196 pricing may not exceed a threshold above prices associated with charging of the modular battery replacement packs 196 at off-peak demand response times. Stated another way, the energy management application may set limits on pricing so that sale of modular battery replacement packs 196 may not be profitable if the modular battery replacement packs 196 are charged at peak times. In this way, efficient energy management may be provided.

In any event, the global positioning system of the portable battery dispensing vehicle (e.g., the distribution vehicle 170) may determine the location associated with the portable battery dispensing vehicle. The communication interface 188 may transmit the location associated with the portable battery dispensing vehicle to the server 102. The processor 174 of the distribution vehicle 170 may receive a request associated with a purchase of one of the modular battery replacement packs 196 carried by the portable battery dispensing vehicle and an indication of a debit to an associated account for a virtual energy credit based on the request associated with the purchase of one or more of the modular battery replacement packs.

In response to this, the controller 172 may unlock a mechanism of the storage bay to enable access to one or more of the modular battery replacement packs. Stated another way, the controller 172 may unlock the mechanism to enable access to the modular battery replacement pack 196 based on the indication of the debit to the associated account for the virtual energy credit. The system 100 for energy management or modular battery replacement may include a sensor. The sensor may detect a presence of a mobile device 120 associated with the request for purchase. According to one aspect, the controller 172 may unlock the mechanism (e.g., door, compartment) to enable access to one or more of the modular battery replacement packs 196 based on the indication of the debit to the associated account for the virtual energy credit and a detected presence of the mobile device 120. Further, the controller 172 and/or mobile device 120 may auto-determine the battery type for the user's vehicle and unlock the appropriate compartment. In other words, if the user has paid for the modular battery replacement pack 196 and it is detected that the user's mobile device 120 is present, the door or compartment to his or her modular battery replacement pack 196 may be unlocked automatically by the controller 172 of the distribution vehicle 170.

The modular battery replacement packs 196 may include an identification mechanism, such as RFID, which may be utilized to identify when the modular battery replacement packs 196 are utilized to power corresponding EVs, for example. Authorized modular battery replacement packs 196 may be configured to perform some type of computer communication or pairing with the EVs. If an unauthorized modular battery replacement pack is utilized, this may be detected by the EV, and the warranty voided.

As discussed above, the processor 174 may identify a location associated with lower electricity pricing or excess renewable energy and the controller 172 may generate or provide an instruction to the portable battery dispensing vehicle to travel to the location associated with the peak demand response time charge. If the distribution is an autonomous vehicle, the processor 174 may utilize one or more vehicle systems (e.g., which may include an autonomous driving module) to have the distribution vehicle 170 autonomously drive from a current location to the location associated with the peak demand response time charge.

According to one aspect, the processor 174 may adjust the debit to the associated account based on whether a used modular battery replacement pack 196 is returned to the portable battery dispensing vehicle in place of the purchased modular battery replacement pack. In other words, the user may be credited an amount for bringing in an old, used modular battery replacement pack, returned for swapping. Stated another way, if the user swaps a first modular battery replacement pack for a second, charged modular battery replacement pack, this may be less expensive or associated with a lower cost than picking up the modular battery replacement pack 196 without returning a used modular battery replacement pack.

Figure 2:
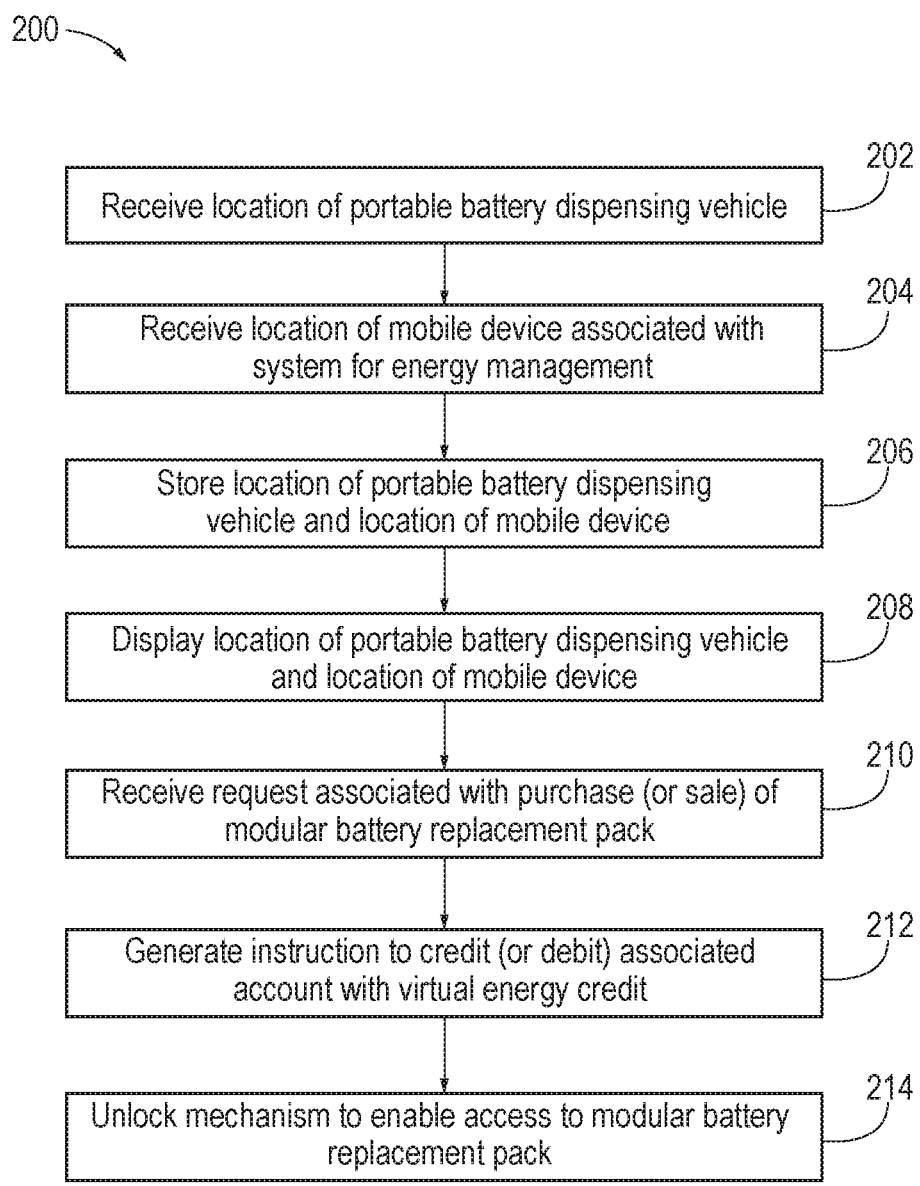
FIG. 2 is an illustration of an exemplary flow diagram of a method for energy management, according to one aspect.

FIG. 2 is an illustration of an exemplary flow diagram of a method 200 for energy management, according to one aspect. The method 200 for energy management may include receiving 202 a location associated with a portable battery dispensing vehicle, determining or receiving 204 a location associated with a mobile device 120 associated with the system 100 for energy management, storing 206 the location associated with the portable battery dispensing vehicle and the location associated with the mobile device 120, displaying 208 the location associated with the portable battery dispensing vehicle and the location associated with the mobile device 120, receiving 210 a request associated with a purchase of a modular battery replacement pack, and generating 212 an instruction to credit an associated account with a virtual energy credit. The method 200 may also include unlocking 214 a mechanism to enable access to one or more of the modular battery replacement packs.

Figure 3:
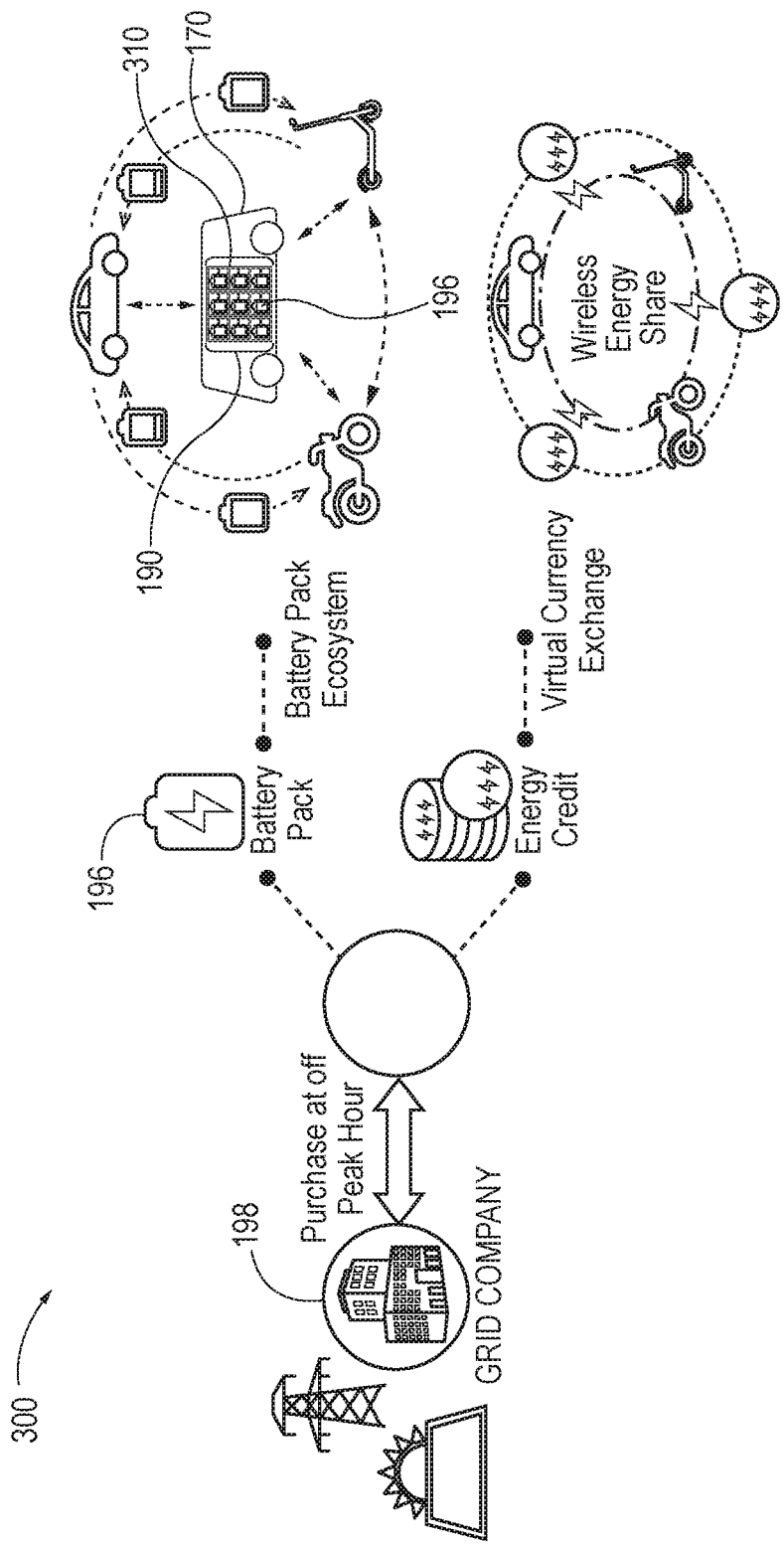
FIG. 3 is an illustration of an exemplary scenario where the system for energy management of FIG. 1 may be implemented, according to one aspect.

FIG. 3 is an illustration of an exemplary scenario 300 where the system 100 for energy management of FIG. 1 may be implemented, according to one aspect. As seen in FIG. 3, the modular battery replacement packs 196 may be charged at the charging center 198 at off-peak demand response times when rates are low. These modular battery replacement packs 196 may be loaded onto portable battery dispensing vehicles or distribution vehicle 170s, which may be found by consumers utilizing the energy management application. As previously discussed, these portable battery dispensing vehicles or distribution vehicle 170s may distribute the modular battery replacement packs 196 using locking mechanisms 310, such as doors which are locked and unlocked by the controller 172 based on whether payment is received and/or proximity of the mobile device 120 to the portable battery dispensing vehicle or distribution vehicle 170. Using the same energy management application, users may purchase the modular battery replacement packs 196 using energy credits or virtual energy credits as a virtual currency (e.g., although transactions may be completed using real currency according to other aspects). The distribution vehicle 170s may be dealership affiliated or private party owned. According to one aspect, the application may regulate pricing based on whether the distribution vehicle 170 is dealership affiliated or private party owned. According to another aspect, the application may regulate pricing based on the price paid to charge the modular battery replacement pack. In this way, energy management or modular battery replacement may be facilitated.

Figure 4B:
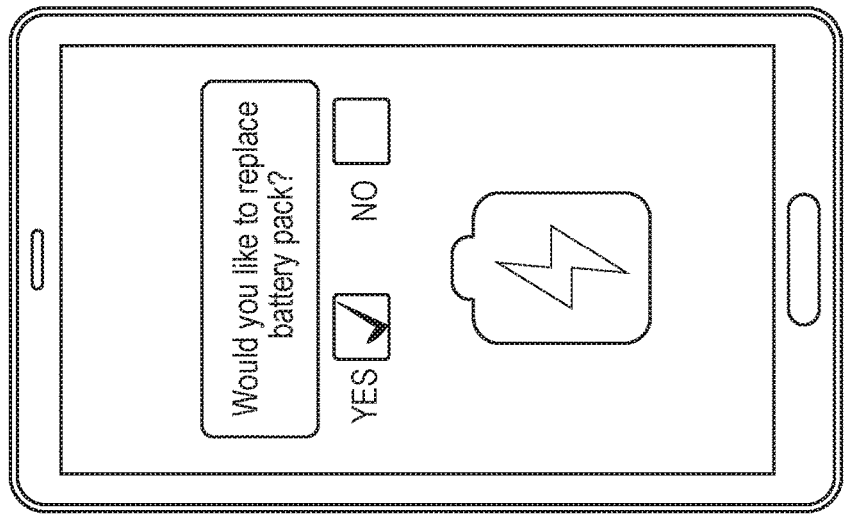
FIGS. 4A-4C are illustrations of an exemplary scenario where the system for energy management of FIG. 1 may be implemented, according to one aspect.
Figure 4A:
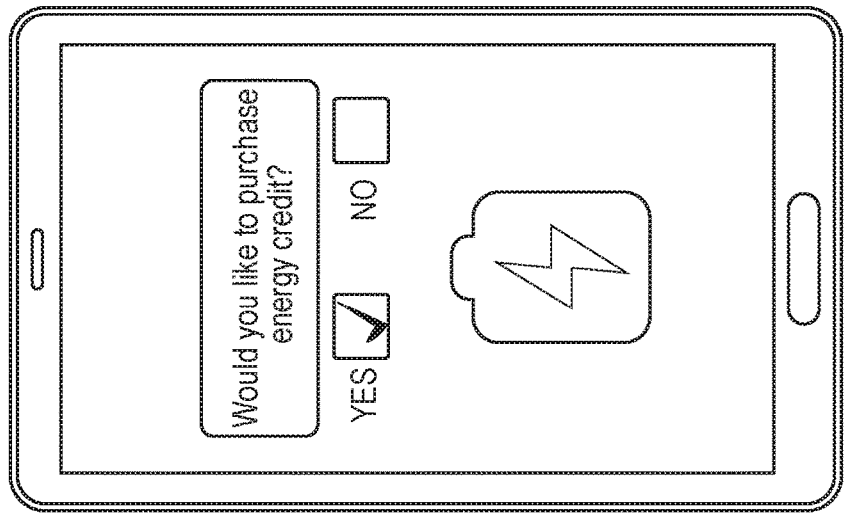
Figure 4C:
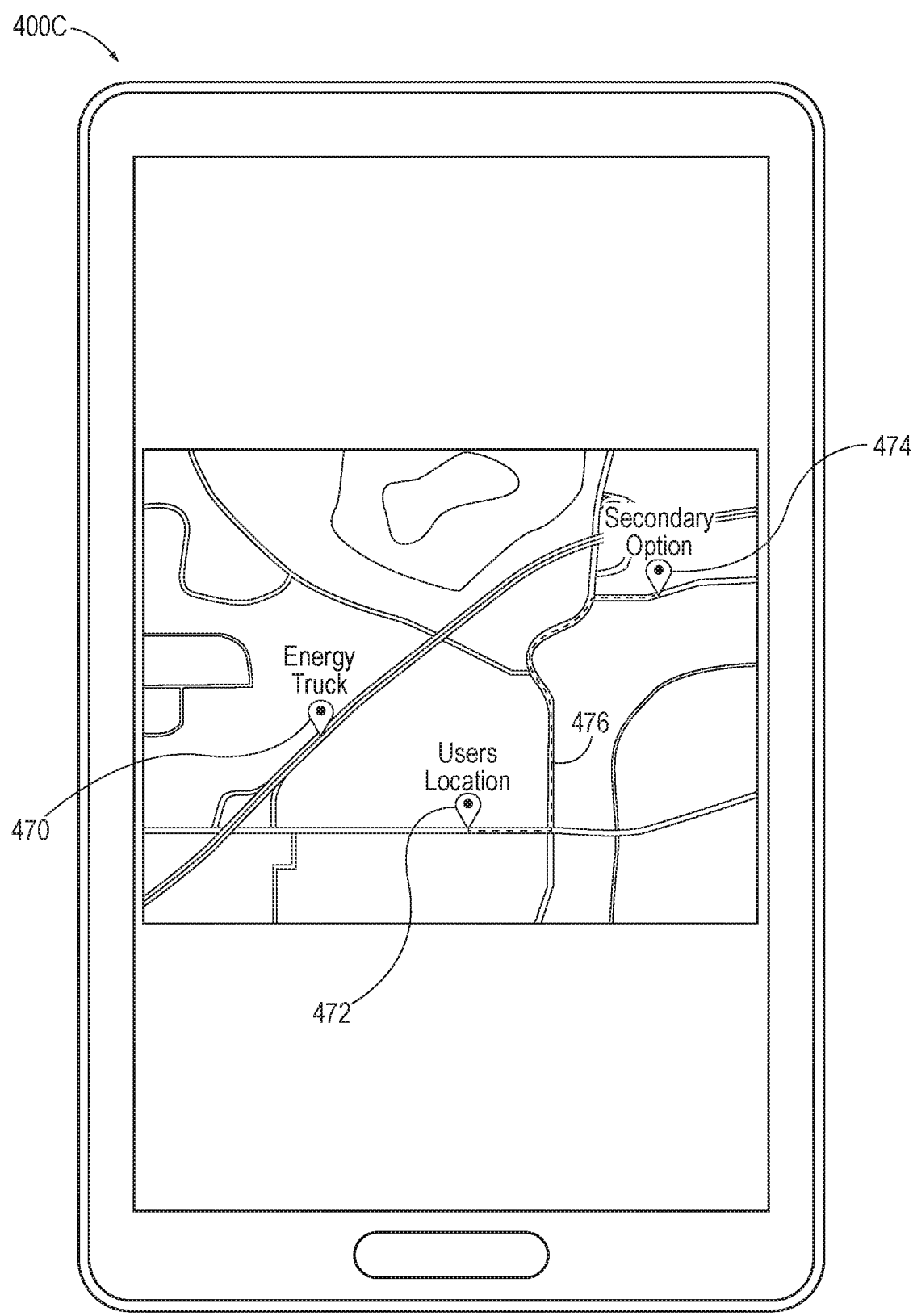

FIGS. 4A-4C are illustrations of exemplary scenarios and user interfaces 400A, 400B, and 400C, respectively, where the system 100 for energy management of FIG. 1 may be implemented, according to one aspect. In FIG. 4A, the energy management application executed by the application module 124 may render an interface 400A including a prompt for a user to purchase energy credit. If the user elects to purchase an energy credit, the user interface 400B of FIG. 4B may be presented or rendered. In FIG. 4B, the user may be presented with a prompt to use his or her energy credit to replace the battery pack. If the user elects to replace or swap a battery pack out, the application may render a map to the nearest distribution vehicle 170. In FIG. 4C, the interface 400C of the application may switch to a maps mode illustrating the nearest distribution vehicles 470, 474 from the user 472 for the modular battery replacement packs, as well as a corresponding route 476.

Figure 5:
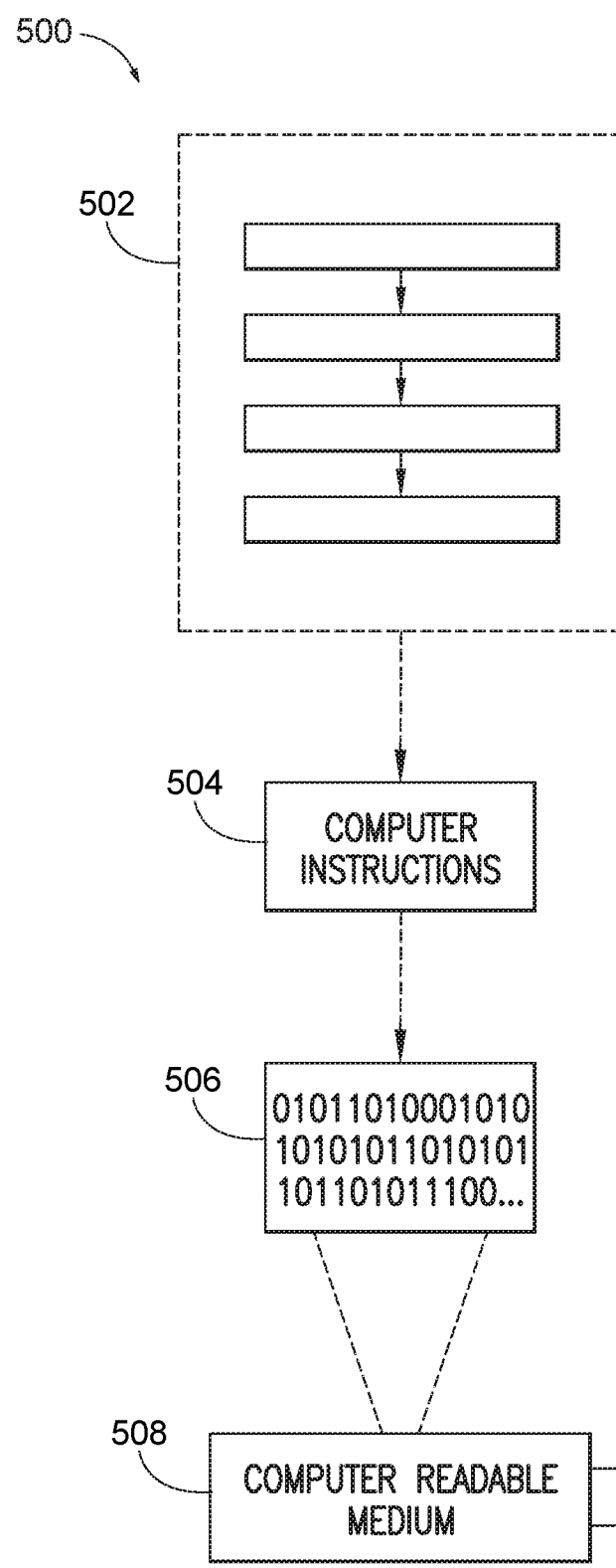
FIG. 5 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 5, wherein an implementation 500 includes a computer-readable medium 508, such as a CD-R, DVD-R, flash drive, a platter of a hard disk drive, etc., on which is encoded computer-readable data 506. This encoded computer-readable data 506, such as binary data including a plurality of zero's and one's as shown in 506, in turn includes a set of processor-executable computer instructions 504 configured to operate according to one or more of the principles set forth herein. In this implementation 500, the processor-executable computer instructions 504 may be configured to perform a method 502, such as the method 200 of FIG. 2. In another aspect, the processor-executable computer instructions 504 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 6:
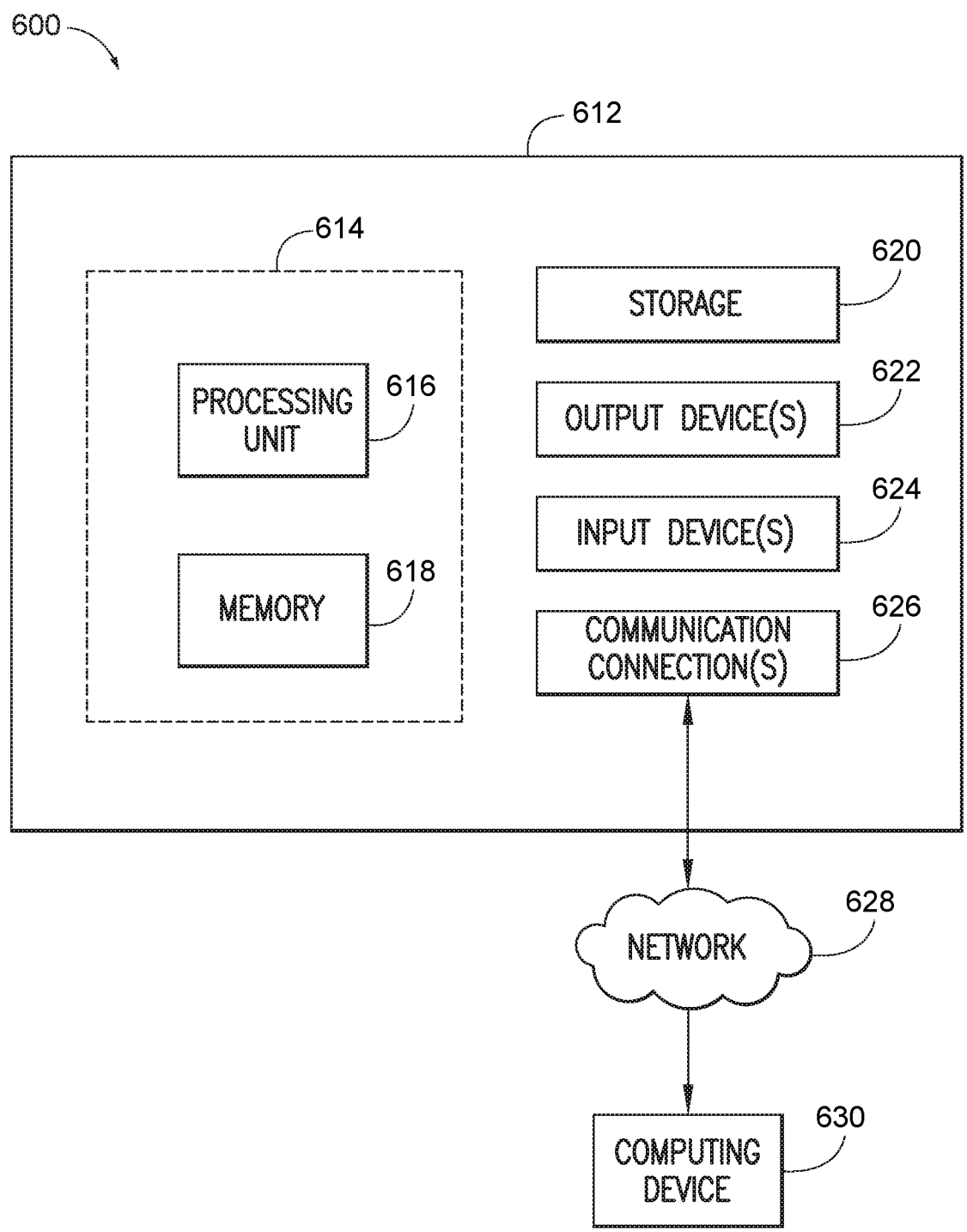
FIG. 6 is an illustration of an example computing environment where one or more of the provisions set forth herein are implemented, according to one aspect.

FIG. 6 and the following discussion provide a description of a suitable computing environment to implement aspects of one or more of the provisions set forth herein. The operating environment of FIG. 6 is merely one example of a suitable operating environment and is not intended to suggest any limitation as to the scope of use or functionality of the operating environment. Example computing devices include, but are not limited to, personal computers, server computers, handheld or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 6 illustrates a system 600 including a computing device 612 configured to implement one aspect provided herein. In one configuration, the computing device 612 includes at least one processing unit 616 and memory 618. Depending on the exact configuration and type of computing device, memory 618 may be volatile, such as RAM, non-volatile, such as ROM, flash memory, etc., or a combination of the two. This configuration is illustrated in FIG. 6 by dashed line 614.

In other aspects, the computing device 612 includes additional features or functionality. For example, the computing device 612 may include additional storage such as removable storage or non-removable storage, including, but not limited to, magnetic storage, optical storage, etc. Such additional storage is illustrated in FIG. 6 by storage 620. In one aspect, computer readable instructions to implement one aspect provided herein are in storage 620. Storage 620 may store other computer readable instructions to implement an operating system, an application program, etc. Computer readable instructions may be loaded in memory 618 for execution by processing unit 616, for example.

The term "computer readable media" as used herein includes computer storage media. Computer storage media includes volatile and nonvolatile, removable and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 612. Any such computer storage media is part of the computing device 612.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 612 includes input device(s) 624 such as keyboard, mouse, pen, voice input device, touch input device, infrared cameras, video input devices, or any other input device. Output device(s) 622 such as one or more displays, speakers, printers, or any other output device may be included with the computing device 612. Input device(s) 624 and output device(s) 622 may be connected to the computing device 612 via a wired connection, wireless connection, or any combination thereof. In one aspect, an input device or an output device from another computing device may be used as input device(s) 624 or output device(s) 622 for the computing device 612. The computing device 612 may include communication connection(s) 626 to facilitate communications with one or more other devices 630, such as through network 628, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for energy management, comprising:
   a communication interface receiving a location associated with a portable battery dispensing vehicle, the portable battery dispensing vehicle carrying one or more modular battery replacement packs associated with an electric vehicle;
   a global positioning system determining a location associated with a mobile device associated with the system for energy management;
   a memory storing the location associated with the portable battery dispensing vehicle and the location associated with the mobile device;
   a display displaying the location associated with the portable battery dispensing vehicle and the location associated with the mobile device; and
   a processor receiving a request associated with a purchase of one of the modular battery replacement packs carried by the portable battery dispensing vehicle,
   wherein the processor generates an instruction to credit an associated account with a virtual energy credit based on the request associated with the purchase of one or more of the modular battery replacement packs.

2. The system for energy management of claim 1, wherein the global positioning system generates turn-by-turn navigation instructions from the location associated with the mobile device to the location associated with the portable battery dispensing vehicle.

3. The system for energy management of claim 1, wherein the portable battery dispensing vehicle is a dealer-affiliated vehicle.

4. The system for energy management of claim 1, wherein the portable battery dispensing vehicle is a private party owned vehicle.

5. The system for energy management of claim 1, wherein one or more of the modular battery replacement packs are charged at off-peak or excess renewable energy times.

6. The system for energy management of claim 1, wherein the communication interface receives a charge level associated with the electric vehicle and the display displays the charge level of the electric vehicle.

7. A system for energy management, comprising:
a communication interface receiving a location associated with a portable battery dispensing vehicle, the portable battery dispensing vehicle carrying one or more modular battery replacement packs associated with an electric vehicle;
the communication interface receiving a location associated with a mobile device associated with the system for energy management;
a memory storing the location associated with the portable battery dispensing vehicle and the location associated with the mobile device;
a processor receiving a request associated with a purchase of one of the modular battery replacement packs carried by the portable battery dispensing vehicle,
wherein the processor generates an instruction to credit an associated account with a virtual energy credit based on the request associated with the purchase of one or more of the modular battery replacement packs.

8. The system for energy management of claim 7, wherein the processor generates turn-by-turn navigation instructions from the location associated with the mobile device to the location associated with the portable battery dispensing vehicle and the communication interface transmits the turn-by-turn navigation instructions to the mobile device.

9. The system for energy management of claim 7, wherein the portable battery dispensing vehicle is a dealer-affiliated vehicle.

10. The system for energy management of claim 7, wherein the portable battery dispensing vehicle is a private party owned vehicle.

11. The system for energy management of claim 7, wherein one or more of the modular battery replacement packs are charged at off-peak or excess renewable energy times.

12. The system for energy management of claim 7, wherein the processor identifies a location associated with lower electricity pricing or excess renewable energy.

13. The system for energy management of claim 12, wherein the communication interface transmits an instruction to the portable battery dispensing vehicle to travel to the location associated with the peak demand response time charge.

14. A system for energy management, comprising:
a global positioning system determining a location associated with a portable battery dispensing vehicle;
a communication interface transmitting the location associated with the portable battery dispensing vehicle, the portable battery dispensing vehicle carrying one or more modular battery replacement packs associated with an electric vehicle;
a processor receiving a request associated with a purchase of one of the modular battery replacement packs carried by the portable battery dispensing vehicle and an indication of a debit to an associated account for a virtual energy credit based on the request associated with the purchase of one or more of the modular battery replacement packs; and
a controller unlocking a mechanism to enable access to one or more of the modular battery replacement packs based on the indication of the debit to the associated account for the virtual energy credit.

15. The system for energy management of claim 14, wherein the portable battery dispensing vehicle is a dealer-affiliated vehicle.

16. The system for energy management of claim 14, wherein the portable battery dispensing vehicle is a private party owned vehicle.

17. The system for energy management of claim 14, wherein one or more of the modular battery replacement packs are charged at off-peak or excess renewable energy times.

18. The system for energy management of claim 14, wherein the processor identifies a location associated with lower electricity pricing or excess renewable energy and wherein the controller provides an instruction to the portable battery dispensing vehicle to travel to the location associated with the peak demand response time charge.

19. The system for energy management of claim 14, comprising a sensor detecting a presence of a mobile device associated with the request for purchase, wherein the controller unlocks the mechanism to enable access to one or more of the modular battery replacement packs based on the indication of the debit to the associated account for the virtual energy credit and the detected presence of the mobile device.

20. The system for energy management of claim 14, wherein the processor adjusts the debit to the associated account based on whether a used modular battery replacement pack is returned to the portable battery dispensing vehicle in place of the purchased modular battery replacement pack.

* * * * *